(12) United States Patent
Koravadi et al.

(10) Patent No.: US 9,729,636 B2
(45) Date of Patent: Aug. 8, 2017

(54) SMART ROAD SYSTEM FOR VEHICLES (71) Applicant: MAGNA ELECTRONICS INC., Auburn Hills, MI (US)

(72) Inventors: Krishna Koravadi, Rochester Hills, MI (US); Paul A. VanOphem, Washington, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 76 days.

(21) Appl. No.: 14/814,882

(22) Filed: Jul. 31, 2015

(65) Prior Publication Data
US 2016/0036917 A1 Feb. 4, 2016

Related U.S. Application Data (60) Provisional application No. 62/032,037, filed on Aug. 1, 2014.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *H04L 29/08* | (2006.01) |
| *G05D 1/02* | (2006.01) |

(Continued)

(52) U.S. Cl.
CPC .............. *H04L 67/12* (2013.01); *B60L 1/00* (2013.01); *B60L 11/182* (2013.01); *G01C 21/3415* (2013.01); *G05D 1/0022* (2013.01); *G05D 1/0027* (2013.01); *G05D 1/0276* (2013.01); *G07C 5/0808* (2013.01); *G07C 5/0816* (2013.01); *G08G 1/0125* (2013.01); *G08G 1/0141* (2013.01); *G08G 1/02* (2013.01); *G08G 1/096708* (2013.01); *G08G 1/096783* (2013.01); *G08G 1/164* (2013.01); *H04W 4/046* (2013.01)

(58) Field of Classification Search
CPC .............. H04L 67/12; G08G 1/096708; G08G 1/096783; G08G 1/0125; G08G 1/02; G08G 1/0141; G08G 1/164; B60L 1/00; B60L 11/182; G01C 21/3415; H04W 4/046; G07C 5/0808; G07C 5/0816; G05D 1/0022; G05D 1/0027; G05D 1/0276
USPC .......................................................... 701/1, 2
See application file for complete search history.

(56) References Cited

U.S. PATENT DOCUMENTS

| | | | | |
|---|---|---|---|---|
| 4,088,937 A | * | 5/1978 | Uchida ................ | H02M 7/162 318/441 |
| 5,595,271 A | * | 1/1997 | Tseng .................... | B60L 5/005 191/10 |

(Continued)

*Primary Examiner* — Jaime Figueroa
(74) *Attorney, Agent, or Firm* — Gardner, Linn, Burkhart & Flory, LLP (57) ABSTRACT

A communication system for vehicles includes a plurality of communication devices integrated into a road. The communication devices are operable to wirelessly communicate with communication systems of vehicles traveling on the road. The communication devices may be electrically powered by solar power. The communication devices wirelessly communicate with a remote server of the communication system. The remote server receives information via the communication devices pertaining to the vehicles traveling on the road and, responsive at least in part to the received information, the remote server communicates information to the vehicles traveling on the road via the communication devices.

20 Claims, 4 Drawing Sheets

(51) Int. Cl.
*G07C 5/08* (2006.01)
*G08G 1/01* (2006.01)
*G08G 1/02* (2006.01)
*G08G 1/16* (2006.01)
*B60L 11/18* (2006.01)
*H04W 4/04* (2009.01)
*G01C 21/34* (2006.01)
*B60L 1/00* (2006.01)
*G08G 1/0967* (2006.01)

(56) References Cited

U.S. PATENT DOCUMENTS

| | | | |
|---|---|---|---|
| 5,760,962 A | 6/1998 | Schofield et al. | |
| 5,796,094 A | 8/1998 | Schofield et al. | |
| 5,877,897 A | 3/1999 | Schofield et al. | |
| 6,129,411 A * | 10/2000 | Neff | B62D 47/003 296/193.03 |
| 6,201,642 B1 | 3/2001 | Bos | |
| 6,396,397 B1 | 5/2002 | Bos et al. | |
| 6,405,132 B1 | 6/2002 | Breed et al. | |
| 6,636,258 B2 | 10/2003 | Strumolo | |
| 6,690,268 B2 | 2/2004 | Schofield et al. | |
| 6,693,517 B2 | 2/2004 | McCarthy et al. | |
| 6,975,246 B1 | 12/2005 | Trudeau | |
| 7,005,974 B2 | 2/2006 | McMahon et al. | |
| 7,038,577 B2 | 5/2006 | Pawlicki et al. | |
| 7,145,519 B2 | 12/2006 | Takahashi et al. | |
| 7,161,616 B1 | 1/2007 | Okamoto et al. | |
| 7,230,640 B2 | 6/2007 | Regensburger et al. | |
| 7,248,283 B2 | 7/2007 | Takagi et al. | |
| 7,295,229 B2 | 11/2007 | Kumata et al. | |
| 7,301,466 B2 | 11/2007 | Asai | |
| 7,580,795 B2 | 8/2009 | McCarthy et al. | |
| 7,592,928 B2 | 9/2009 | Chinomi et al. | |
| 7,720,580 B2 | 5/2010 | Higgins-Luthman | |
| 7,855,755 B2 | 12/2010 | Weller et al. | |
| 7,881,496 B2 | 2/2011 | Camilleri et al. | |
| 8,892,345 B2 * | 11/2014 | Arcot | G08G 1/0129 429/143 |
| 9,218,001 B2 * | 12/2015 | Lee | G05D 1/0263 |
| 9,478,129 B1 * | 10/2016 | Kothari | G08G 1/0125 |
| 2003/0095039 A1 | 5/2003 | Shimomura et al. | |
| 2006/0254142 A1 | 11/2006 | Das et al. | |
| 2007/0032245 A1 * | 2/2007 | Alapuranen | G08G 1/161 455/456.1 |
| 2009/0033474 A1 | 2/2009 | Chen | |
| 2010/0085171 A1 | 4/2010 | Do | |
| 2011/0032119 A1 | 2/2011 | Pfeiffer et al. | |
| 2011/0112720 A1 * | 5/2011 | Keep | B60R 16/02 701/36 |
| 2012/0062743 A1 | 3/2012 | Lynam et al. | |
| 2012/0065858 A1 | 3/2012 | Nickolaou | |
| 2012/0218412 A1 | 8/2012 | Dellantoni et al. | |
| 2013/0116859 A1 | 5/2013 | Ihlenburg et al. | |
| 2013/0342333 A1 | 12/2013 | Hutchings | |
| 2014/0032091 A1 * | 1/2014 | Arcot | G08G 1/0129 701/119 |
| 2014/0088796 A1 * | 3/2014 | Lee | G05D 1/0263 701/2 |
| 2014/0195068 A1 * | 7/2014 | Boss | G06F 19/00 701/1 |
| 2014/0195138 A1 * | 7/2014 | Stelzig | G08G 1/0116 701/119 |
| 2014/0218529 A1 | 8/2014 | Mahmoud | |
| 2014/0222323 A1 | 8/2014 | Purushothaman | |
| 2014/0253345 A1 * | 9/2014 | Breed | G08G 1/096716 340/905 |
| 2014/0309806 A1 * | 10/2014 | Ricci | B60Q 1/00 701/1 |
| 2014/0309864 A1 * | 10/2014 | Ricci | H04W 48/04 701/36 |
| 2014/0375476 A1 | 12/2014 | Johnson et al. | |
| 2015/0124096 A1 | 5/2015 | Koravadi | |
| 2015/0158499 A1 | 6/2015 | Koravadi | |
| 2015/0228188 A1 * | 8/2015 | Macfarlane | G08G 1/0129 340/936 |
| 2015/0232065 A1 * | 8/2015 | Ricci | B60R 25/01 701/36 |
| 2015/0251599 A1 | 9/2015 | Koravadi | |
| 2015/0352953 A1 | 12/2015 | Koravadi | |
| 2016/0260328 A1 * | 9/2016 | Mishra | G08G 1/163 |
| 2016/0358477 A1 * | 12/2016 | Ansari | G08G 1/167 |

* cited by examiner

SMART ROAD SYSTEM FOR VEHICLES

CROSS REFERENCE TO RELATED APPLICATION

The present application claims the filing benefits of U.S. provisional application Ser. No. 62/032,037, filed Aug. 1, 2014, which is hereby incorporated herein by reference in its entirety.

FIELD OF THE INVENTION

The present invention relates generally to a communication system for vehicles and, more particularly, to a vehicle communication system that provides or communicates information to or between vehicles traveling along a road.

BACKGROUND OF THE INVENTION

Communication systems for vehicles may provide for communication between vehicles and/or between a vehicle and a remote server. Such car2car or V2V and car2X or V2X technology provides for communication between vehicles based on information provided by one or more vehicles and/or information provided by a remote server or the like. Examples of such systems are described in U.S. Pat. No. 7,580,795 and/or U.S. Publication Nos. US-2012-0218412, published Aug. 30, 2012, and/or US-2012-0062743, published Mar. 15, 2012, which are hereby incorporated herein by reference in their entireties.

SUMMARY OF THE INVENTION

The present invention provides a vehicle communication system that includes communication devices incorporated into or integrated in a powered road or strip along a roadway, whereby the communication system is operable to communicate information to vehicles traveling along the road and is operable to receive information from vehicles traveling along the road. The communication system and road is/are solar powered so that the devices disposed along the road may operate without a wired power supply connection to a power plant or the like.

These and other objects, advantages, purposes and features of the present invention will become apparent upon review of the following specification in conjunction with the drawings.

LEGEND

10—vehicle;
12—vision system of vehicle;
14a-d—vehicle cameras;
16—display;
18—controller;
20—interior rearview mirror assembly;
21—dedicated short-range communication (DSRC) radio or high speed wireless radio modem;
22—wireless radio antenna to communicate with the smart road;
23—reliable and secure wireless communication link between vehicle and smart road;
24—solar panel to power the high speed radio communication modem module;
25—power connector between solar panel and high speed modem;
26—high speed communication modem and gateway (integral part of the smart road);
27—high speed wireless antenna, integral part of the smart road;
28—smart road;
29—high speed fiber optic network connecting high speed communication modem and gateway to the central server;
30—high computation power super computers executing safety monitoring and automated driving algorithms;
31—vehicle with wireless or conductive charging capability;
32—conductive tire assembly;
33—solar panel integrated conductive surface;
34—conductive charger controller integral part of the smart road;
35—conductive charger output;
36—power source for the conductive charging controller;
37—wireless charger as the integral part of the smart road;
38—induction power transmission link;
39—power connection between solar panel and the power source;
40—power converter;
50—vehicle sensor modules (radar, cameras, IMU, GPS, lidar etc.);
51—automated/semi-automated control module;
52—actuators (engine, transmission, brake, steering controller);
53—internal safety monitoring module;
54—high speed wireless link integral part of the smart road;
55—alert/warning system part of the vehicle (dedicated display in case of safety interventions);
57—smart road sensors that communicate with other automated vehicles and provide location, vehicle information (acceleration, brake etc.);
58—surround view vehicle information processing module;
59—internet connectivity to get access to map, weather and traffic information;
60—central safety monitoring (semi-automated vehicle case) or control of automated driven vehicles traveling in the smart road;
61—sensor feedback from the individual vehicles are transmitted to central processing module via high speed wireless link; and
62—local vehicle control out is monitored by the central monitoring and control module.

DESCRIPTION OF THE PREFERRED EMBODIMENTS

Figure 1:
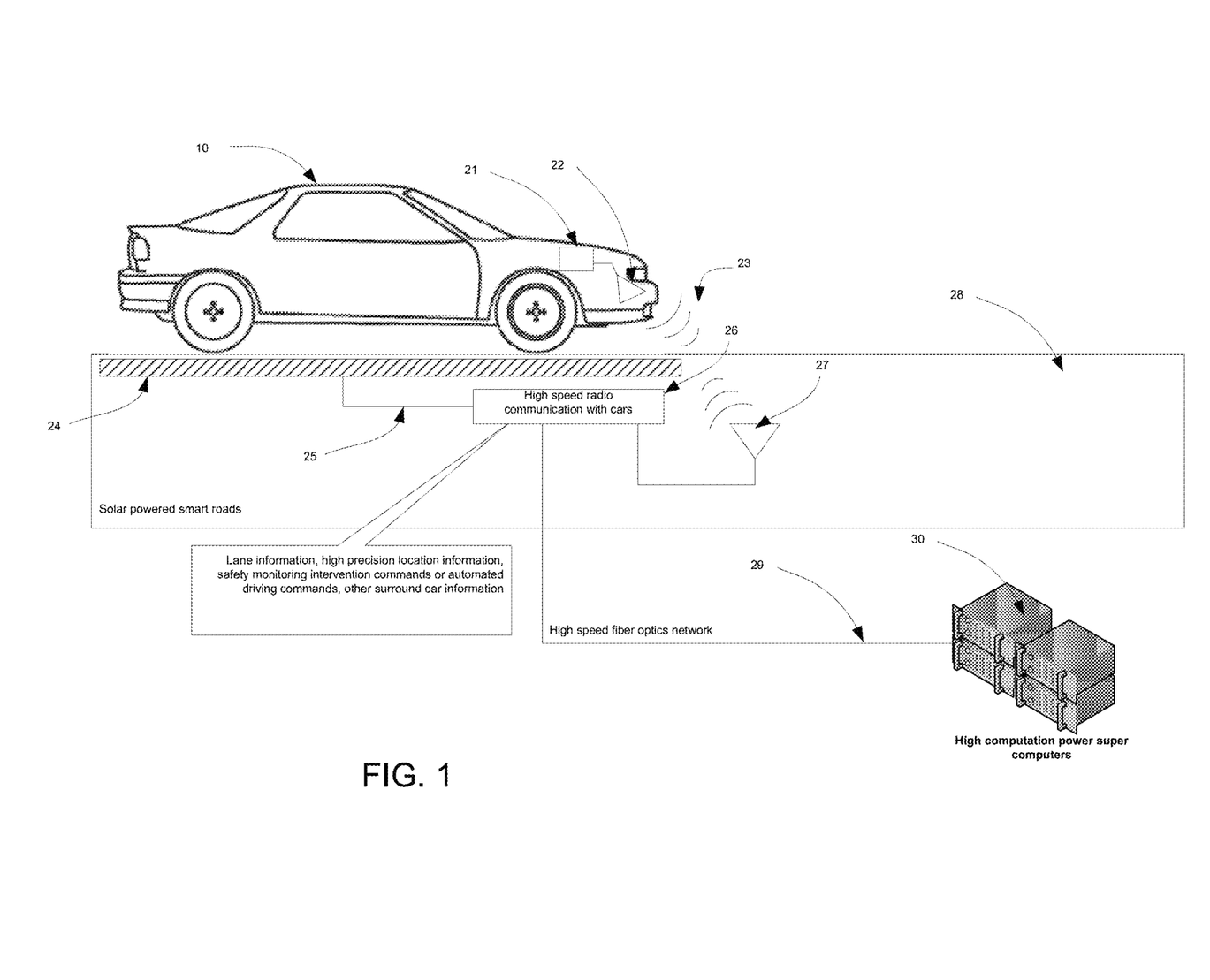
FIG. 1 is a side elevation of a vehicle traveling along a smart road having a communication system in accordance with the present invention.
Figure 2:
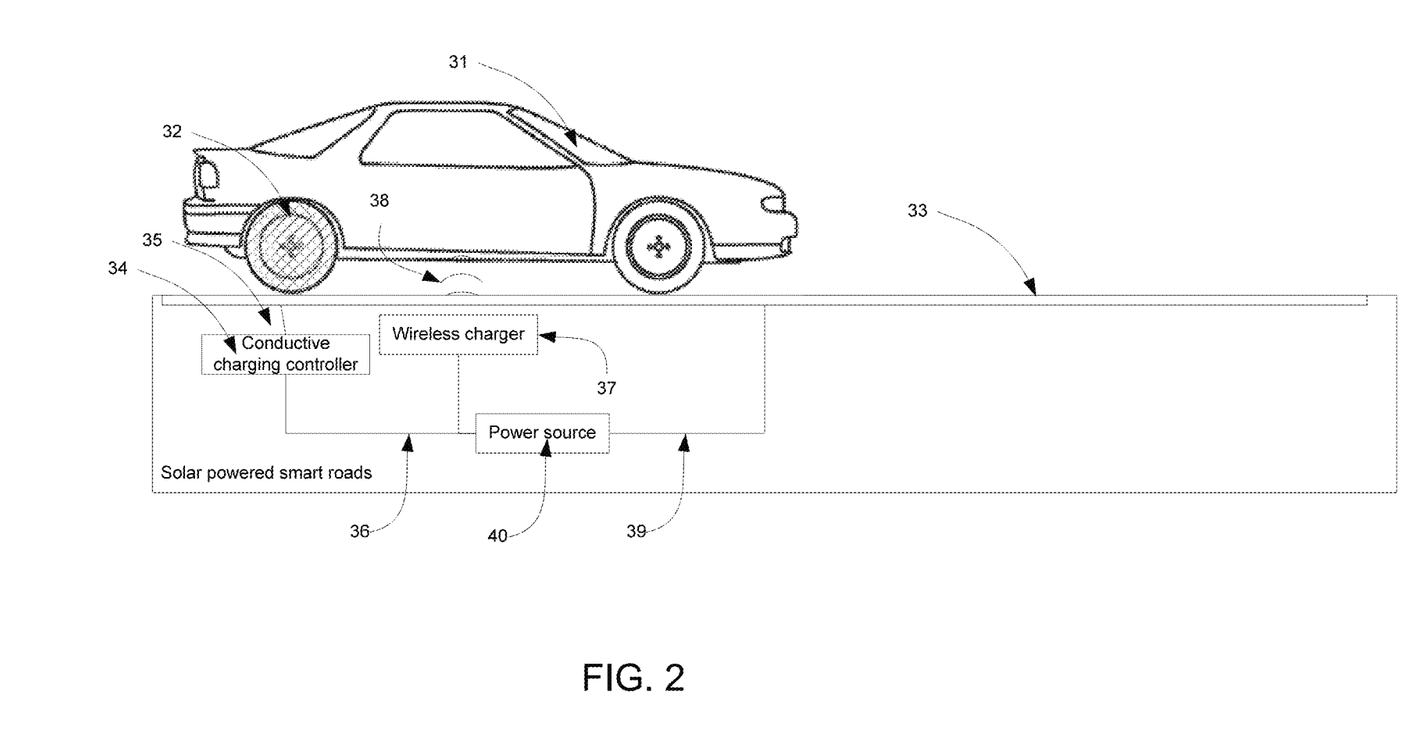
FIG. 2 is a side elevation of an electric vehicle traveling along another smart road having a communication system in accordance with the present invention.
Figure 3:
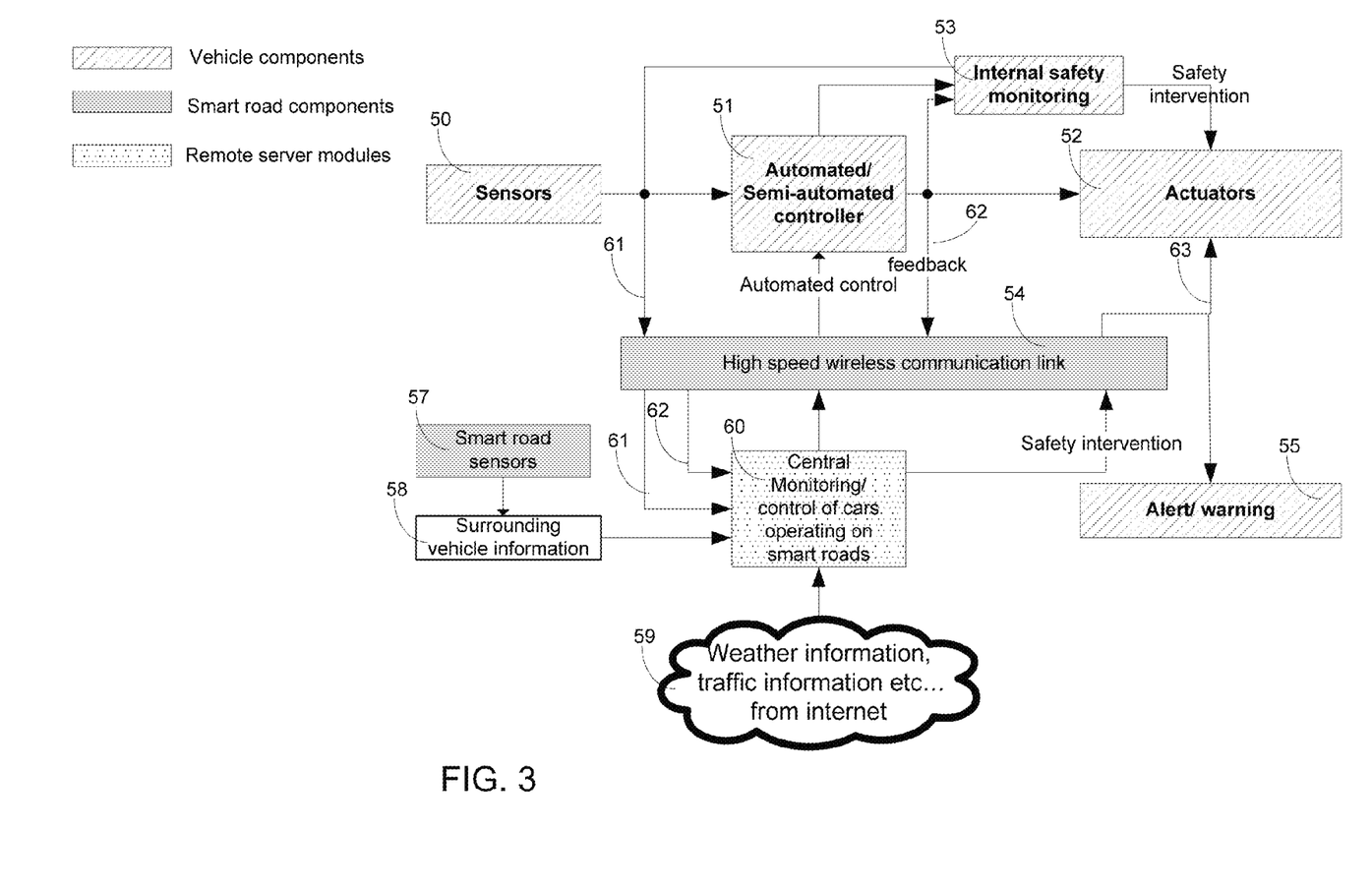
FIG. 3 is a block diagram of the smart road and vehicle communication system of the present invention.

Referring now to the drawings and the illustrative embodiments depicted therein, a communication system includes communication devices disposed along or integrated in a solar powered roadway (FIGS. 1-3). Solar powered roadways for providing different lighting configurations have been proposed. An example of such a solar powered roadway is described at http://www.solarroadways.com/intro.shtml.

The present invention provides solar powered roads that include a communication system that communicates (using a high speed secure network) with the vehicles traveling on and along the road and with vehicles traveling at any speed on and along the road, which makes the solar powered roads of the present invention "smart roads." The smart roads may detect or sense the exact location of the traveling vehicles using sensors or receivers along the smart roads (such as a receiver that receives a communication from vehicles, such as a communication that is substantially continuously transmitted by a vehicle communication system and that identifies the particular vehicle). Vehicles using the smart roads may communicate to the smart road system information pertaining the vehicle's sensors, actuators and/or driver intent information and/or the like.

The smart roads of the present invention may be connected via any suitable means, such as a high speed secure fiber optics network or the like, to a remote or central system, such as a system having high speed super computers or remote servers or the like. The central system may be operable (such as responsive to a determination of an autonomous vehicle on one of the smart roads) to drive the automated vehicles on the smart road. For example, as an autonomous vehicle enters the smart road/lane, the communication system of the vehicle communicates information about the location or route that is entered for the vehicle to follow, the smart road system receives this communication and communicates the information to the high speed super computers of the central server, which has all the environment information and road information and transmits commands to the fully automated vehicle in real time to control the autonomous vehicle and drive it from its current location along the desired route and to its final destination. Because the smart road system has information of other roads along the path of travel towards the destination of the autonomous vehicle, the system road system may adjust or alter the route, such as responsive to traffic or weather conditions or the like. The system may monitor the behavior of automated/semi-automated/manually driven vehicles and take necessary safety intervention in case of system malfunction or driver error. For example, responsive to a determination of a hazardous condition of a semi-automated/manually driven vehicle traveling on and along the smart road, the system may communicate signals to that vehicle to a vehicle control system of that vehicle to control at least one of the throttle of the vehicle, the brakes of the vehicle and the steering of the vehicle as the vehicle travels on the road, whereby the driver may temporarily relinquish control of a manually driven or semi-autonomous vehicle to the control unit of the smart road system.

The smart road system may transmit the exact lane information with respect to a vehicle traveling along the road, which could be used for lane keep assist, automated lane change and/or the like of that vehicle and other vehicles traveling in the same lane or other lanes of the road. Because the smart road system may send the information on the vehicle to other vehicles in the vicinity of the vehicle, the driver intent may be communicated to other vehicles and this information may be fused with the existing ADAS sensors and used for ADAS feature enhancement (such as for adaptive cruise control (ACC), cross traffic alert, lane departure warning, lane keep assist and/or the like).

As shown in FIG. 1, vehicles 10 may include a DSRC radio 21 and wireless radio antenna 22 to communicate (via a reliable and secure wireless communication link 23) with a high speed wireless antenna 27 that is an integral part of the smart road 28. The smart road 28 includes solar panels 24 that power the high speed radio communication modem or module 26 via power connector 25. A high speed fiber optics network 29 may connect the communication device or modem 26 with a remote server 30 (such as a high computation power computer or server or the like). The smart road thus may receive vehicle information from the vehicle and may communicate other information to the vehicle system or may control one or more accessories or systems of the vehicle. The information may include lane information, location information, safety monitoring intervention commands or automated driving commands or other vehicle information about the vehicle and/or its surroundings and/or other vehicles at or near the subject vehicle or elsewhere on the road ahead of or behind the subject vehicle).

Optionally, and such as shown in FIG. 2, the smart road system of the present invention may comprise a self-power source (such as a solar powered smart road system) and the smart road may be operable charge the batteries or power source of electric vehicles, such as by using wireless charging systems or conductive tires or the like, such that the electric vehicles may be charged as they travel along the road. For example, and such as shown in FIG. 2, a vehicle 31 may include a conductive wheel/tire assembly 32 that rollingly engages a solar panel integrated conductive surface 33 of the smart road as the vehicle travels along and on the smart road. The smart road includes a conductive charger controller 34 as an integral part of the smart road, and the controller 34 generates a conductive charger output 35 for powering the conductive surface 33 for charging the vehicle power source. The smart road includes a power source 40 that powers the conductive charging controller via connection 36 and powers the conductive surface 33 via connection 39. Optionally, the power source 40 may power a wireless charger 37 of the smart road that provides an induction power transmission link 38 for inductively charging the power source of the vehicle as the vehicle travels along and on the smart road.

Optionally, the smart road system of the present invention may provide high precision geographical location information of vehicles traveling along the road(s), because the precise geographical location of points along the roads may be entered and known when the smart roads are deployed. This information may be communicated to the vehicles and may act as redundant GPS information, which may be useful in situations where GPS satellite reception is lost or interrupted, such as in cities with dense buildings, tunnels and/or the like). Optionally, the smart road system may communicate location based advertisements to the vehicles traveling along the road (such as advertisements for fuel, restaurants, hotels or the like) that are local to the current known geographical location of the vehicle traveling along the smart road.

Because the geographic location information is well known during the installation of the smart road, the smart road may transmit or communicate high resolution geographic information to vehicles traveling on and along the smart road. Such geographic information may be redundant to the satellite GPS signal received by the vehicle-based GPS systems, and is also useful in situations where the vehicle's GPS satellite reception is lost or interrupted, such as in a tunnel or in cities and/or the like. The geographical information may be transmitted by the communication devices responsive to determination or detection of a vehicle traveling along the road at or near respective geographical locations, with each communication device communicating information pertaining to the sensed location of the vehicle on the road. For example, the system (without input from the remote server) may transmit geographical information to vehicles traveling on and along the road so that the vehicles receive accurate geographical location information (that is either redundant to the vehicle-based GPS systems or that supplements the vehicle-based GPS systems if the satellite signals are lost or interrupted). Optionally, for example, the communication devices of the road (responsive to the remote server that may receive vehicle information) may communicate information to a vehicle traveling on the road pertaining to a destination location and route for that vehicle (where such information may be communicated by the vehicle via a V2X communication link to the communication devices and/or remote server), such that the vehicle maintains the navigation information even if the satellite signals are lost or interrupted.

Optionally, because the lane marking information is also known during the installation of the smart road, the smart road communication devices may transmit or communicate lane information (such as for a lane departure warning system of the vehicles), such as responsive to the sensors of the smart road (and processor or server) sensing or determining the vehicle location on the road surface. For example, if a vehicle starts to move out of a lane and into another lane occupied by another vehicle, the smart road (knowing the location of both vehicles and the lane boundaries) can generate a signal to an alert system of the lane-changing vehicle to alert the driver of the hazardous condition. The smart road may transmit or communicate lane location information to vehicles traveling on and along the road, and such communication may be redundant to lane marker detection by the vehicles, but will be very useful in poor visibility conditions (such as in snow or rain or mud conditions), where the vehicle sensor (such as a forward viewing camera) may have difficulty determining the lane markers on the road ahead of the vehicle. The lane information may be transmitted by the communication devices responsive to determination or detection of a vehicle traveling along the road at or near respective communication devices, with each communication device communicating information pertaining to the sensed location of the vehicle on the road relative to the lane or lanes along which the vehicle is traveling.

Optionally, because the smart road system may be connected with a high speed backend network, the system may be operable to provide a high speed wireless connection for the vehicles traveling along the smart road, so that the vehicle systems may access the network for infotainment, web browsing and/or the like.

As shown in FIG. 3, the smart road communication system utilizes components of vehicles traveling on and along the smart road, and components of the smart road itself and components of a remote server. The vehicle may include sensors 50 and actuators 52, and may include one or more systems that provide an alert/warning 55 to the driver or that provide internal safety monitoring 53 or that provide automated or semi-automated control 51 of the vehicle. The smart road also includes sensors 57 and provides high speed wireless communication link 54 for communicating with one or more of the systems or accessories of the vehicle, and may receive information or feedback from the one or more accessories or systems of the vehicle. The remote server may receive information or data from the smart road sensors 57 and surrounding vehicle information 58 (such as from other sensors of the smart road or from other vehicle communications) and may receive sensor feedback 61 from individual vehicles and/or local vehicle control 62 from the communication link 54 of the smart road. The central monitoring/control 60 may also receive weather information or traffic information 59 or the like, such as from the internet. The control 60 receives such information and communicates information to the smart road communication link, whereby the smart road communication link may communicate information to the vehicle or vehicles traveling on and along the smart road and/or may provide a safety intervention of one or more vehicles traveling on and along the smart road (such as responsive of a determination of a hazardous condition ahead of the subject vehicle or the like).

Thus, the smart road system or communication system of the present invention provides enhanced communication with vehicles traveling on and along the smart road and may provide automated or semi-automated control of such vehicles.

The vehicles traveling along the road may include any suitable communication system that is capable of transmitting vehicle information to the smart road system's communication devices and receiving information from the smart road system's communication devices. For example, the vehicle communication systems may utilize aspects of the systems described in U.S. Pat. Nos. 6,690,268; 6,693,517; 7,156,796 and/or 7,580,795, and/or U.S. Publication Nos. US-2015-0158499; US-2015-0124096; US-2014-0218529; US-2014-0375476; US-2012-0218412; and/or US-2012-0062743, and/or U.S. patent application Ser. No. 14/730,544, filed Jun. 4, 2015 and published Dec. 10, 2015 as U.S. Publication No. US-2015-0352953, which are all hereby incorporated herein by reference in their entireties.

Optionally, the vehicles may include a vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 4:
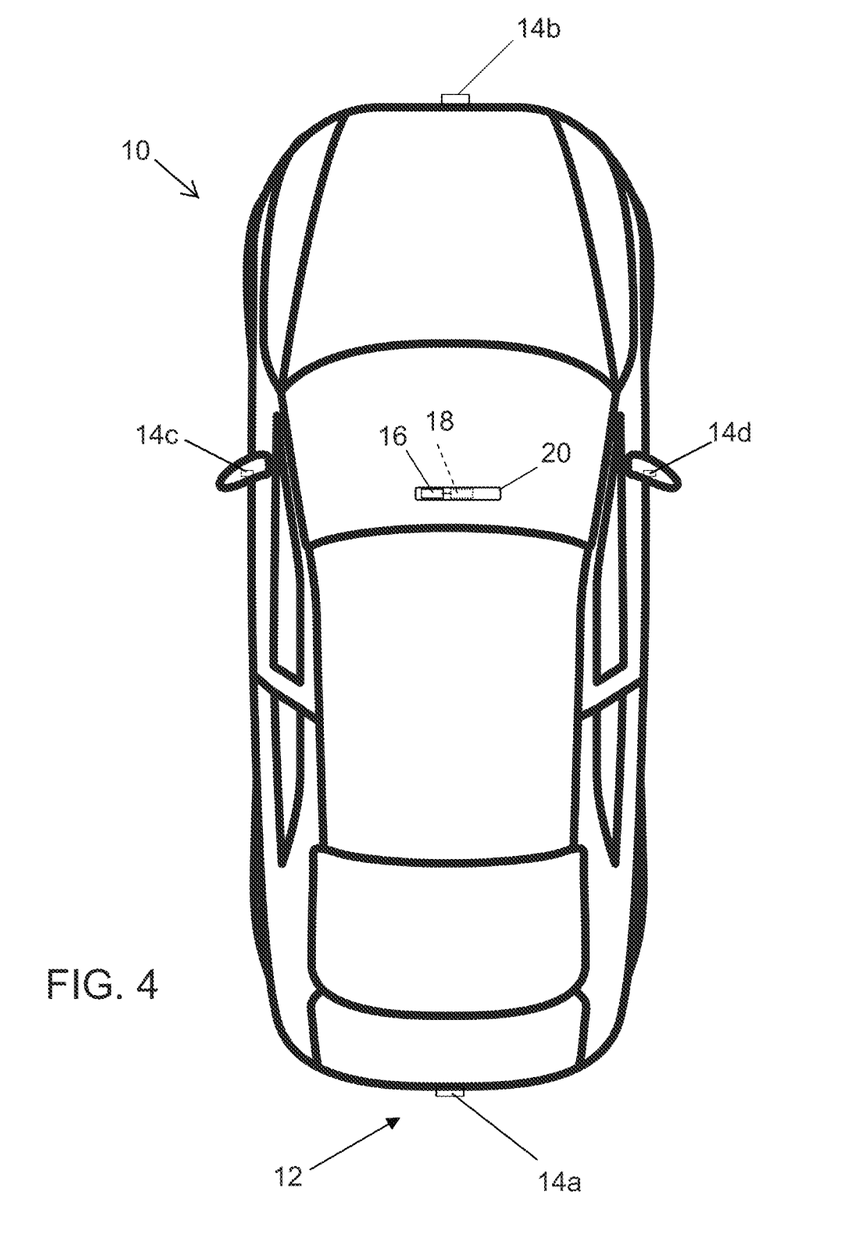
FIG. 4 is a plan view of a vehicle with a vision system that incorporates cameras in accordance with the present invention.

For example, and as shown in FIG. 4, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera. The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, which are hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A communication system for vehicles, said communication system comprising:
   a plurality of communication devices at respective geographic locations along the road;
   wherein said communication devices are operable to wirelessly communicate with communication systems of vehicles traveling on the road;
   wherein said communication devices of the road communicate lane boundary information to the vehicles traveling on the road, and wherein, when a vehicle receiving the communicated lane boundary information is moving out of a lane into an adjacent lane that is occupied by another vehicle, an alert at that vehicle is generated to alert a driver of that vehicle; and
   wherein said communication devices of the road communicate location information to the vehicles traveling on the road pertaining to the respective geographical locations of said communication devices, and wherein the location information is communicated at least during situations where GPS satellite reception at the vehicles is lost or interrupted.

2. The communication system of claim 1, comprising a charging device disposed at the road for charging a battery of an electric vehicle traveling on the road, and wherein, responsive to a communication indicative of an electric vehicle traveling on the road, said charging device charges the battery of the electric vehicle as the electric vehicle travels on the road.

3. The communication system of claim 1, wherein, responsive to a communication from an autonomous vehicle traveling on the road, said system communicates signals to an automated driving system of the autonomous vehicle to control the autonomous vehicle as it travels on the road.

4. The communication system of claim 3, wherein said communication devices wirelessly communicate with a remote server of said communication system, and wherein said remote server receives information via said communication devices pertaining to the vehicles traveling on the road and, responsive at least in part to the received information, said remote server communicates information to the vehicles traveling on the road, and wherein the communication from the autonomous vehicle includes information about a destination location and route that is entered for the autonomous vehicle to follow, and wherein, responsive to the communication from the autonomous vehicle, said remote server, which has environment information and road information pertaining to the destination location and route, transmits commands to the autonomous vehicle to control the autonomous vehicle from its current geographical location along the route and to the destination location.

5. The communication system of claim 4, wherein, responsive to information pertaining to at least one of (i) traffic condition information and (ii) weather information, said remote server is operable to adjust the route.

6. The communication system of claim 1, wherein, responsive to a hazardous condition of the vehicle traveling on the road, said system communicates signals to a vehicle control system of the vehicle to control at least one of the throttle of the vehicle, the brakes of the vehicle and the steering of the vehicle as the vehicle travels on the road.

7. The communication system of claim 1, comprising a plurality of sensors disposed along the road for determining lane positions of vehicles traveling on the road, wherein said communication system communicates with vehicle-based systems of the vehicles traveling on the road to provide lane position information to the vehicles traveling on the road.

8. The communication system of claim 1, wherein said communication devices comprise a plurality of receivers that receive communications from vehicles traveling on the road.

9. The communication system of claim 8, wherein the vehicle communications are substantially continuously transmitted by a vehicle communication system and wherein the vehicle communication identifies the particular vehicle traveling on the road.

10. The communication system of claim 8, wherein the vehicle communications communicate information pertaining to at least one of (i) sensors of the vehicle, (ii) actuators of the vehicle and (iii) driver intent information of the driver of the vehicle.

11. The communication system of claim 1, wherein said communication devices wirelessly communicate with a remote server of said communication system, and wherein said remote server receives information via said communication devices pertaining to the vehicles traveling on the road and, responsive at least in part to the received information, said remote server communicates information to the vehicles traveling on the road, and wherein the information received by said remote server includes driver intent information pertaining to the driver of one of the vehicles traveling on the road, and wherein, responsive to the driver intent information, said remote server communicates information pertaining to the driver intent information to other vehicles in the vicinity of the one of the vehicle traveling on the road.

12. The communication system of claim 11, wherein the driver intent information is input to driver assistance systems of the other vehicles.

13. The communication system of claim 1, wherein said communication devices of the road communicate information to a vehicle traveling on the road pertaining to a destination location and route for the vehicle to supplement the vehicle-based GPS system when the GPS satellite reception at the vehicle is lost or interrupted.

14. The communication system of claim 1, wherein said communication devices of the road communicate lane boundary information to the vehicle traveling on the road irrespective of image data captured by a camera of the vehicle.

15. A communication system for vehicles, said communication system comprising:
   a plurality of sensors integrated into a road for sensing vehicles traveling on the road;
   a plurality of communication devices at respective geographic locations along the road;
   wherein said communication devices comprise a plurality of receivers that receive communications from vehicles traveling on the road;
   wherein said communication devices are operable to wirelessly communicate with communication systems of vehicles traveling on the road;
   wherein, responsive to a hazardous condition of a vehicle traveling on the road, said system communicates signals to a vehicle control system of the vehicle to control at least one of the throttle of the vehicle, the brakes of the vehicle and the steering of the vehicle as the vehicle travels on the road;
   wherein said communication devices of the road communicate lane boundary information to the vehicles traveling on the road, and wherein, when a vehicle receiving the communicated lane boundary information is moving out of a lane into an adjacent lane that is occupied by another vehicle, an alert at that vehicle is generated to alert a driver of that vehicle; and
   wherein said communication devices of the road communicate location information to the vehicles traveling on the road pertaining to the respective geographical locations of said communication devices, and wherein the location information is communicated at least during situations where GPS satellite reception at the vehicles is lost or interrupted.

16. The communication system of claim 15, comprising a charging device disposed at the road for charging a battery of an electric vehicle traveling on the road, and wherein, responsive to a communication indicative of an electric vehicle traveling on the road, said charging device charges the battery of the electric vehicle as the electric vehicle travels on the road.

17. The communication system of claim 15, wherein said communication devices wirelessly communicate with a remote server of said communication system, and wherein said remote server receives information via said communication devices pertaining to the vehicles traveling on the road and, responsive at least in part to the received information, said remote server communicates information to the vehicles traveling on the road, wherein the information received by said remote server includes driver intent information pertaining to the driver of one of the vehicles traveling on the road, and wherein, responsive to the driver intent information, said remote server communicates information pertaining to the driver intent information to other vehicles in the vicinity of the one of the vehicle traveling on the road.

18. A communication system for vehicles, said communication system comprising:
   a plurality of sensors integrated into a road for sensing vehicles traveling on the road;
   a plurality of communication devices at respective geographic locations along the road;

wherein said communication devices comprise a plurality of receivers that receive communications from vehicles traveling on the road;

wherein said communication devices are operable to wirelessly communicate with communication systems of vehicles traveling on the road;

wherein said communication devices wirelessly communicate with a remote server of said communication system;

wherein said remote server receives information via said communication devices pertaining to the vehicles traveling on the road and, responsive at least in part to the received information, said remote server communicates information to the vehicles traveling on the road;

wherein said communication devices of the road communicate location information to the vehicles traveling on the road pertaining to the respective geographical locations of said communication devices, and wherein the location information is communicated at least during situations where GPS satellite reception at the vehicles is lost or interrupted;

wherein said communication devices of the road communicate location information to the vehicle traveling on the road pertaining to a destination location and route for the vehicle, and wherein the information is communicated at least during situations where a GPS satellite reception at the vehicle is lost or interrupted;

wherein said communication devices of the road communicate lane boundary information to the vehicles traveling on the road, and wherein, when a vehicle receiving the communicated lane boundary information is moving out of a lane into an adjacent lane that is occupied by another vehicle, an alert at that vehicle is generated to alert a driver of that vehicle; and wherein said communication devices of the road communicate lane boundary information to the vehicle traveling on the road irrespective of image data captured by a camera of the vehicle.

19. The communication system of claim 18, comprising a charging device disposed at the road for charging a battery of an electric vehicle traveling on the road, and wherein, responsive to a communication indicative of an electric vehicle traveling on the road, said charging device charges the battery of the electric vehicle as the electric vehicle travels on the road.

20. The communication system of claim 18, wherein the location information and lane boundary information are substantially continuously transmitted by said communication devices at least when the vehicle is detected on the road at or near a respective communication device.

* * * * *